United States Patent [19]

Haluska et al.

[11] Patent Number: 5,508,062

[45] Date of Patent: Apr. 16, 1996

[54] METHOD FOR FORMING AN INSOLUBLE COATING ON A SUBSTRATE

[75] Inventors: Loren A. Haluska; Cecil L. Frye; Harold L. Vincent, all of Midland, Mich.; Keith D. Weiss, Eaden Prairie, Minn.

[73] Assignee: Dow Corning Corporation, Midland, Mich.

[21] Appl. No.: 348,640

[22] Filed: Dec. 2, 1994

[51] Int. Cl.$^6$ ........................................................ B05D 3/02
[52] U.S. Cl. .......................... 427/226; 427/379; 427/384; 427/387
[58] Field of Search ..................................... 427/384, 387, 427/226, 379

[56] References Cited

U.S. PATENT DOCUMENTS

| | | |
|---|---|---|
| 3,615,272 | 10/1971 | Collins et al. . |
| 3,811,918 | 5/1974 | Levene . |
| 3,965,280 | 6/1976 | Ceyzeriat et al. ............... 427/387 |
| 4,753,856 | 6/1988 | Haluska et al. ............... 428/698 |
| 4,756,977 | 7/1988 | Haluska et al. ............... 428/704 |

Primary Examiner—Janyce Bell
Attorney, Agent, or Firm—Roger E. Gobrogge

[57] ABSTRACT

Disclosed is a method of forming a coating on a substrate. The method comprises applying a silane and, optionally, a titanium catalyst, onto the substrate and allowing the silane to hydrolyze and condense with atmospheric moisture to form an insoluble coating.

23 Claims, No Drawings

METHOD FOR FORMING AN INSOLUBLE COATING ON A SUBSTRATE

BACKGROUND OF THE INVENTION

This invention relates to a method of forming an insoluble coating on a substrate from an unhydrolyzed silane. The method generally comprises applying a coating mixture comprising the silane and, optionally, a titanium catalyst on the substrate and allowing the coating mixture to hydrolyze in atmospheric moisture and condense to form the insoluble coating.

It is known in the art that hydrolyzed or partially hydrolyzed silanes are useful for forming coatings. For instance, Levene in U.S. Pat. No. 3,811,918 teaches the use of partially hydrolyzed silicon alkoxides and metal oxide forming compounds to form protective coatings. Similarly, Collins et al. in U.S. Pat. No. 3,615,272 and Haluska et al. in U.S. Pat. No. 4,756,977 teach the use of hydrolyzed trichlorosilane (i.e., hydrogen silsesquioxane resin) to form coatings on substrates. Finally, Haluska et al. in U.S. Pat. No. 4,753,856 teach the use of hydrogen silsesquioxane resin with metal oxide precursors (including titanium oxide) for forming coatings on substrates.

Such processes are disadvantageous in many instances because they require the silane be hydrolyzed prior to forming the coatings. This hydrolysis can be costly, time consuming and can generate a variety of undesirable by-products. It has now been unexpectedly found that coatings of siloxane resin or silicate structure can be formed by in-place hydrolysis and condensation of surface films of silanes.

SUMMARY OF THE INVENTION

This invention relates to a method of forming an insoluble coating on a substrate. The method comprises mixing a composition comprising a silane of the formula $R_nSi(OR^1)_{4-n}$ and, optionally, a titanium catalyst to form a coating mixture. In this formula R is hydrogen, an alkyl, an alkenyl, a cycloalkyl, or an aryl, $R^1$ is independently an organic group which, when bonded to silicon through the oxygen atom, forms a hydrolyzable substituent and n is 0–2. The coating mixture is then applied on a substrate and allowed to hydrolyze with atmospheric moisture and condense in place to form the insoluble coating.

DETAILED DESCRIPTION OF THE INVENTION

The present inventors have discovered that silanes will hydrolyze and condense in the presence of atmospheric moisture to form insoluble coatings. This reaction was unexpected since the prior art teaches that the silanes need to be at least partially hydrolyzed and precondensed to be effective coating agents. Avoiding this hydrolysis and associated condensation reaction provides numerous processing advantages.

As used in the present invention, an "insoluble coating" is one which will not dissolve when subjected to a solvent which dissolves the silane used to form the coating.

The substrates to be coated by the instant invention are limited only by the need for thermal and chemical stability of the substrate under the conditions used for deposition. It is, therefore, contemplated, that the process of the invention could be used on substrates such as plastics, ceramics, metals, electronic circuits, electronic devices, and the like.

The silanes useful in the present invention have the following general formula:

$$R_nSi(OR^1)_{4-n}$$

R in this formula is hydrogen, an alkyl such methyl, ethyl, propyl, etc, an alkenyl such as vinyl, allyl, etc., a cycloalkyl such as cyclohexyl, or an aryl such as phenyl. $R^1$ in this formula can be any organic group which, when bonded to silicon through the oxygen atom, forms a hydrolyzable substituent. Examples of such hydrolyzable groups include alkoxy such as methoxy, ethoxy, propoxy, butoxy, or hexoxy; alkenoxy such as ethenoxy or propenoxy; cycloalkoxy such as cyclopentoxy or cyclohexoxy; aryloxy such as phenoxy; cycloalkenyloxy such as cyclopentoxy; and acyloxy such as acetoxy. The various organic radicals above can also be substituted, for example, by alkyls, aryls, halogens or alkoxy groups. n in the above formula is 0–2. Obviously, mixtures of the above may also be used.

It should be noted that silanes of the structure:

$$R_2Si(OR^1)_2$$

are generally not used as the sole silane since volatile cyclic structures may be generated during pyrolysis. Small amounts (e.g., less than 25 wt. %) of these silanes, however, may be added to the above silanes to modify the resultant coating.

It should also be noted that disiloxanes and trisiloxanes of the structure $R_3SiOSiR_3$ and $R_3SiOSiR_2OSiR_3$ may also be used with the silanes of the invention. In these structures, R is as defined above.

Preferably, R in the above formula is hydrogen, an alkyl, alkenyl or aryl of 1-6 carbon atoms. It is more preferred that R is hydrogen, methyl, ethyl, propyl, vinyl or phenyl. Preferably, $R^1$ is a hydrocarbon of 1–6 carbon atoms. It is more preferred that $R^1$ is an alkyl with 1–6 carbon atoms or an acyl. Preferably, n is 0–1. It is more preferred that n is 1.

Most preferably, the silane is trimethoxysilane, triethoxysilane, triacetoxysilane, methyltrimethoxysilane, methyltriethoxysilane, methyltriacetoxysilane, phenyltrimethoxysilane, phenyltriethoxysilane, phenyltriacetoxysilane, and tetraethoxysilane.

When the hydrolyzable group in the above formula is an acyloxy such as acetoxy, hydrolysis of the substituent generates an acid such as acetic acid. This acid, in turn, acts as a catalyst for further hydrolysis and condensation. When the hydrolyzable substituent is not an acyloxy, a titanium catalyst is added to the mixture to assist in hydrolysis.

The titanium catalysts, if used, can be any which are soluble or can be dispersed in the silane. Examples include titanium alkoxides, titanium halides, alkyl titanium compounds, and the like. Preferred are titanium alkoxides such as titanium isopropoxide.

The titanium compound is generally included in the silane mixture in an amount of about 50 to 1000 ppm titanium based on the weight of the silane.

The above silane can also be doped with boron or phosphorous by including a boron or phosphorous compound with hydrolyzable substituents. Examples of such compounds include $B(OR^1)_x$ and $P(OR^1)_x$ wherein $R^1$ is as defined above and x is 2–5 depending on the valence of the B or P.

If desired, the silane and the optional titanium catalyst can be mixed in a solvent to form a solution or dispersion which is applied to the surface of the substrate. Solvents which may be used include any non-aqueous agent or mixture of agents which will dissolve or disperse the silane and titanium to form a homogenous solution without affecting the resultant coating. These solvents can include, for example, alcohols such as ethyl or isopropyl, aromatic hydrocarbons such as benzene or toluene, alkanes such as n-heptane or dodecane, ketones, esters, ethers, or cyclic dimethylpolysiloxanes, in an amount sufficient to dissolve or disperse the above materials. Generally, enough of the above solvent is used to form a 0.1–85 weight percent solution.

Various facilitating measures can be used to dissolve/disperse the silane and any optional titanium or solvent. These include, for example, stirring, blending and/or heating to dissolve or disperse the materials to create a more uniform mixture.

The solution comprising the silane and any titanium or solvent is then coated onto the substrate. The method of coating can be, but is not limited to, spin coating, dip coating, spray coating or flow coating. Other equivalent means, however, are also deemed to be within the scope of this invention.

The mixture is then allowed to react with the moisture in the atmosphere and, thereby, hydrolyze and condense the silane into insoluble material. During this time, any solvent used and/or byproducts are also generally evaporated. An example of the reactions which occur are as follows:

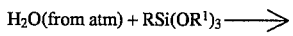

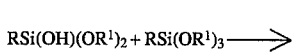

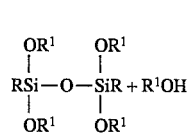

The atmospheric moisture can be at any concentration desired. For example, the moisture concentration can be from about 5% up to 99%. Generally, however, the higher the moisture level the faster the hydrolysis occurs. As such, moisture can be added to the environment as desired.

The time necessary for the silane to hydrolyze and condense can vary over a wide range. Factors such as temperature, moisture concentration, catalyst concentration and the specific silane all have an effect. Generally, however, the time is from about 5 minutes up to about 5 hours. It should be noted that the exposure to atmospheric humidity can occur concomitantly with any subsequent heating.

After hydrolysis and condensation, an insoluble, gelled, silane condensate coating results. This coating is generally planar and is crack and pore free.

If desired, the insoluble coating can be heated at a temperature sufficient to convert it to a silica-containing material. The heating can be conducted under any environment desired such as inert gases (e.g., argon, nitrogen, etc.) or reactive gases (air, ammonia, amines, moisture, ozone, nitrous oxide, hydrogen, etc.).

Generally, the temperatures useful for such heating are in the range of about 100° C. to about 600° C. Higher and lower temperatures, however, are also contemplated in the invention. For example, lower temperatures may be used but they often result in incomplete conversion of the coating to silica and reduced densification. Similarly, higher temperatures (e.g., 1000° C.) may be used but the need is diminished since the coating can generally be converted to silica at lower temperatures.

Generally, the coated substrates are heated for a time sufficient to convert the silica precursor to silica. Time periods in the range of a few minutes for very thin films to several hours (e.g., 6 hours) for very thick films, depending on the temperature, are generally useful herein. It is particularly preferred to heat the coated substrates at a temperature of about 200°–500° C. for about 1–3 hours.

Any method of heating such as the use of a quartz tube furnace, a convection oven, reverse direction processing as described in U.S. patent application Ser. No. 07/633,707, now allowed and assigned to the same assignee hereof, or radiant or microwave energy is generally functional herein. Similarly, the rate of heating is generally not a critical factor, but it is most practical and preferred to heat the substrate as rapidly as possible.

If the coating is heated, a thin silica-containing ceramic coating is produced. In addition, the coating may be covered by other coatings such as additional $SiO_2$ layers, silicon containing coatings, silicon carbon containing coatings, silicon nitrogen containing coatings, silicon oxygen nitrogen containing coatings and/or silicon nitrogen carbon containing coatings. Such multiple layer coatings are known in the art and many are described in U.S. Pat. No. 4,756,977 which is hereby incorporated by reference.

Coatings produced by the instant invention are useful as protective coatings, as corrosion resistant and abrasion resistant coatings, as temperature and moisture resistant coatings, as dielectric layers and as a diffusion barrier against ionic impurities such as sodium and chloride.

The following nonlimiting examples are provided so that one skilled in the art may more fully understand the invention.

EXAMPLES 1–6

The silane compositions as set forth in the following Table 1 were mixed and applied to 2 Motorola 14011B CMOS devices by spinning at 3000 rpm for 10 seconds. The coated devices were pyrolyzed in air at 400° C. for 1 hour. The coated devices were then exposed to salt spray and tested to determine if they still functioned. The devices were tested as initially formed and after 17, 41, 67 and 91 hours of exposure. The results are presented in Table 1.

TABLE 1

| Ex. | Silane Material | Device | Salt Spray Resistance (Hr) | |
| --- | --- | --- | --- | --- |
| | | | Passed | Failed |
| 1 | 3.0 g toluene | 1 | 67 | 91 |
| | 9.0 g phenyltriacetoxysilane | 2 | 17 | 41 |
| | 2.0 g dimethyldiacetoxysilane | | | |
| 2 | 10.0 g phenyltrimethoxysilane | 1 | 41 | 67 |
| | 2.0 g dimethyldiacetoxysilane | 2 | 67 | 91 |
| | 1 drop titanium tetraisopropoxide | | | |
| 3 | 10.0 g methyltrimethoxysilane | 1 | 41 | 67 |
| | 2 drops titanium tetraisopropoxide | 2 | 41 | 67 |
| 4 | 10.0 g methyltriacetoxysilane | 1 | 0 | 17 |
| | | 2 | 17 | 41 |
| 5 | 10.0 g trimethoxysilane | 1 | 67 | 91 |
| | 2 drops titanium tetraisopropoxide | 2 | 41 | 67 |
| 6 | Uncoated Devices | 1 | 0 | 17 |
| | | 2 | 0 | 17 |

EXAMPLE 7

Trimethoxysilane $(HSi(OCH_3)_3)$ was dissolved in hexane to concentrations of 5–15 wt.%. Titanium isopropoxide was added to the solutions in concentrations of 0, 15, 150 and 1500 ppm titanium based on the weight trimethoxysilane. KBr disks were coated with the solutions and allowed to dry under atmospheric conditions. The films containing 0 and 15 ppm titanium were of poor quality. The film containing 150 ppm titanium was of excellent quality. The film containing 1500 ppm titanium had a small amount of flaking due to its thickness.

What is claimed is:

1. A method of forming an insoluble coating on a substrate comprising:

mixing a composition comprising a silane of the formula $R_nSi(OR^1)_{4-n}$ and 50 to 1000 ppm of a titanium catalyst to form a coating mixture, wherein each R is a hydrogen or a hydrocarbon of 1–20 carbon atoms, $R^1$ is independently an organic group which, when bonded to silicon through the oxygen atom, forms a hydrolyzable substituent and n is 0–2;

applying the coating mixture on a substrate;

exposing the coated substrate to atmospheric moisture for a time sufficient to form an insoluble coating, and heating the substrate having the insoluble coating at a temperature between 100° and 600° C. for up to 6 hours.

2. The method of claim 1 wherein $R^1$ is selected from the group consisting of alkyls, alkenyls, aryls and acyls.

3. The method of claim 1 wherein $R^1$ is selected from the group consisting of an alkyls containing 1–6 carbon atoms and acyls containing 1–6 carbon atoms and n is 1.

4. The method of claim 1 wherein R is selected from the group consisting of hydrogen, methyl, ethyl, propyl, vinyl and phenyl.

5. The method of claim 1 wherein said silane is selected from the group consisting of trimethoxysilane, triethoxysilane, triacetoxysilane, methyltrimethoxysilane, methyltriethoxysilane, methyltriacetoxysilane, phenyltrimethoxysilane, phenyltriethoxysilane, phenyltriacetoxysilane and tetraethoxysilane.

6. The method of claim 1 wherein a solvent is also present in the coating mixture in an amount to dilute the silane to between about 0.1 and about 85 weight percent solids.

7. The method of claim 1 wherein said substrate is an electronic device.

8. The method of claim 1 wherein the titanium catalyst is one which has hydrolyzable substituents to render it soluble in the silane mixture.

9. The method of claim 1 wherein the coating mixture is doped with boron or phosphorous.

10. The method of claim 1 wherein the coating mixture also contains a material selected from the group consisting of $R_3SiOSiR_3$ and $R_3SiOSiR_2OSiR_3$, wherein each R is a hydrogen or a hydrocarbon of 1–20 carbon atoms.

11. A method of forming an insoluble coating on a substrate comprising:

applying a coating composition comprising a silane of the formula $R_nSi(OR^1)_{4-n}$ on a substrate, wherein each R is a hydrogen or a hydrocarbon of 1–20 carbon atoms, $R^1$ is an acyl group and n is 0–1;

exposing the coated substrate to atmospheric moisture for a time sufficient to form an insoluble coating, and heating the substrate having the insoluble coating at a temperature between 100° and 600° C. for up to 6 hours.

12. The method of claim 11 wherein R is selected from the group consisting of hydrogen, methyl, ethyl, propyl, vinyl and phenyl.

13. The method of claim 11 wherein a solvent is also present in the coating composition in an amount to dilute the silane to between about 0.1 and about 85 weight percent solids.

14. The method of claim 11 wherein a material of the structure $R_2Si(OR^1)_2$ is also added to the coating composition at less than 25 wt. % of the silane.

15. The method of claim 11 wherein said substrate is an electronic device.

16. The method of claim 11 wherein the coating composition is doped with boron or phosphorous.

17. The method of claim 11 wherein the coating composition also contains a material selected from the group consisting of $R_3SiOSiR_3$ and $R_3SiOSiR_2OSiR_3$, wherein each R is a hydrogen or a hydrocarbon of 1–20 carbon atoms.

18. A method of forming an insoluble coating on a substrate comprising:

mixing a composition consisting essentially of a silane of the formula $R_nSi(OR^1)_{4-n}$ and 50 to 1000 ppm of a titanium catalyst to form a coating mixture, wherein each R is a hydrogen or a hydrocarbon of 1–20 carbon atoms, $R^1$ is independently an organic group which, when bonded to silicon through the oxygen atom, forms a hydrolyzable substituent and n is 0–2;

applying the coating mixture on a substrate; and exposing the coated substrate to atmospheric moisture for a time sufficient to form an insoluble coating.

19. A method of forming an insoluble coating on a substrate comprising:

applying a coating composition consisting essentially of a silane of the formula $R_nSi(OR^1)_{4-n}$ on a substrate, wherein each R is a hydrogen or a hydrocarbon of 1–20 carbon atoms, $R^1$ is an acyl group and n is 0–1; and exposing the coated substrate to atmospheric moisture for a time sufficient to form an insoluble coating.

20. A method of forming an insoluble coating on a substrate comprising:

mixing a composition comprising a silane of the formula $H_nSi(OR^1)_{4-n}$ and 50 to 1000 ppm of a titanium catalyst to form a coating mixture, wherein each $R^1$ is independently an organic group which, when bonded to silicon through the oxygen atom, forms a hydrolyzable substituent and n is 1–2;

applying the coating mixture on a substrate; and exposing the coated substrate to atmospheric moisture for a time sufficient to form an insoluble coating.

21. A method of forming an insoluble coating on a substrate comprising:

applying a coating composition comprising a silane of the formula $H_nSi(OR^1)_{4-n}$ on a substrate, wherein each $R^1$ is an acyl group and n is 1–2; and exposing the coated substrate to atmospheric moisture for a time sufficient to form an insoluble coating.

22. A method of forming an insoluble coating on a substrate comprising:

mixing a composition consisting essentially of a silane of the formula $R_nSi(OR^1)_{4-n}$, 50 to 1000 ppm of a titanium catalyst and at least one material selected from the group consisting of solvents, boron, phosphorous, $R_3SiOSiR_3$, $R_3SiOSiR_2OSiR_3$ and $R_2Si(OR^1)_2$, to form a coating mixture, wherein each R is a hydrogen or a hydrocarbon of 1–20 carbon atoms, $R^1$ is independently an organic group which, when bonded to silicon through the oxygen atom, forms a hydrolyzable substituent and n is 0–2;

applying the coating mixture on a substrate; and exposing the coated substrate to atmospheric moisture for a time sufficient to form an insoluble coating.

23. A method of forming an insoluble coating on a substrate comprising:

applying a coating composition consisting essentially of a silane of the formula $R_nSi(OR^1)_{4-n}$, and at least one material selected from the group consisting of solvents, boron, phosphorous, $R_3SiOSiR_3$, $R_3SiOSiR_2OSiR_3$ and $R_2Si(OR^1)_2$, on a substrate, wherein each R is a hydrogen or a hydrocarbon of 1–20 carbon atoms, $R^1$ is an acyl group and n is 0–1; and exposing the coated substrate to atmospheric moisture for a time sufficient to form an insoluble coating.

* * * * *